(12) United States Patent
Toumbas

(10) Patent No.: US 11,703,444 B2
(45) Date of Patent: Jul. 18, 2023

(54) HIGH RESOLUTION PARTICLE SIZING AT SMALLER DIMENSIONS WITH HIGHLY FOCUSED BEAMS AND OTHER NON-UNIFORM ILLUMINATION FIELDS

(71) Applicant: Paul Toumbas, New Port Richey, FL (US)

(72) Inventor: Paul Toumbas, New Port Richey, FL (US)

( * ) Notice: Subject to any disclaimer, the term of this patent is extended or adjusted under 35 U.S.C. 154(b) by 84 days.

(21) Appl. No.: 17/405,985

(22) Filed: Aug. 18, 2021

(65) Prior Publication Data

US 2021/0381949 A1 Dec. 9, 2021

Related U.S. Application Data

(62) Division of application No. 16/840,331, filed on Apr. 4, 2020, now Pat. No. 11,280,719.

(51) Int. Cl.
G01N 15/14 (2006.01)
G01N 15/10 (2006.01)

(52) U.S. Cl.
CPC ..... *G01N 15/1459* (2013.01); *G01N 15/1012* (2013.01); *G01N 15/1429* (2013.01); *G01N 15/1434* (2013.01); *G01N 2015/1402* (2013.01); *G01N 2015/1493* (2013.01)

(58) Field of Classification Search
None
See application file for complete search history.

(56) References Cited

U.S. PATENT DOCUMENTS

| 2002/0126275 A1* | 9/2002 | Johnson | G01N 15/1434 356/317 |
| 2004/0011975 A1* | 1/2004 | Nicoli | G01N 15/0227 250/574 |
| 2010/0035235 A1* | 2/2010 | Gabriel | G01N 15/0211 435/7.1 |

* cited by examiner

Primary Examiner — Rufus L Phillips
(74) Attorney, Agent, or Firm — Justin Luby

(57) ABSTRACT

A particle sizing method which allows for counting and sizing of particles within a colloidal suspension flowing through a single-particle optical sizing sensor SPOS apparatus using pulse height detection and utilizing non-parallel and non-uniform illumination within the sensing region of the flow cell. The method involves utilizing a deconvolution process which requires the SPOS apparatus to be characterized during a calibration phase. Once the SPOS apparatus has been characterized, the process of deconvolution after a data collection run, recursively eliminates the expected statistical contribution to the pulse height distribution PHD histogram in all the lower channels from the highest channel height detected, and repeating this for all remaining channels in the PHD, removing the contributions from largest to smallest sizes.

5 Claims, 14 Drawing Sheets

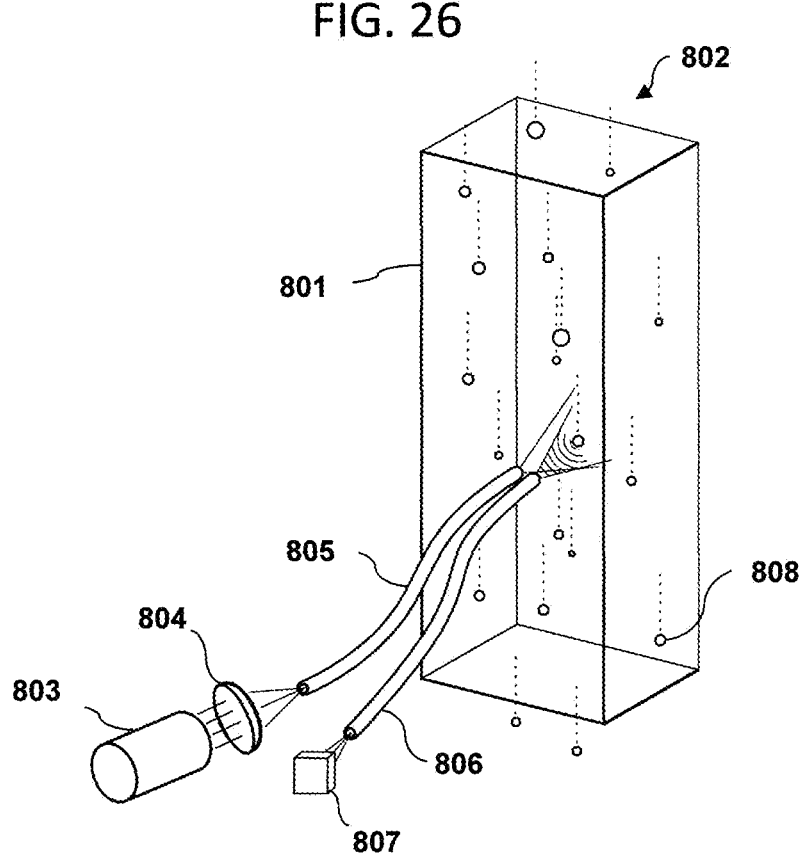

HIGH RESOLUTION PARTICLE SIZING AT SMALLER DIMENSIONS WITH HIGHLY FOCUSED BEAMS AND OTHER NON-UNIFORM ILLUMINATION FIELDS

CROSS-REFERENCE TO RELATED APPLICATIONS

Divisional application to pending application Ser. No. 16/840,331 filed Apr. 4, 2020

FIELD OF THE INVENTION

This invention relates to methods and apparatus for optical sensing, including counting and sizing of individual particles of varying size in a fluid suspension, and more particularly, to such methods and apparatus which yield higher sensitivity and detection at higher concentration than can be realized by optical sensors of conventional design.

BACKGROUND

In the world of SPOS (single particle optical sizing) and counting, traditional prior art has utilized a light field, as uniform in intensity throughout an illumination zone as possible, and in as tightly a structure as possible (small slice of light equals higher measurement concentration limits), using various optical elements, and intersect this illumination zone thusly created with particles suspended in a fluid within a flow channel—usually encapsulated in a transparent flow cell. Laser light illumination is often preferred as it can be easily collimated, and the monochromatic nature makes it easier to focus to smaller regions.

Having a uniform light field interacting with a moving particle, makes the first order correlation between particle size and pulse height a direct one-to-one relationship. The correlation between particle diameter and amount of light scattered and/or extinguished at micron dimensions is to a first approximation linear (when viewed in log-log space), and typically some of the non-linearities are removed by the use of a calibration curve. The calibration curve being a sort of a reverse look up table of pulse height to diameter.

Pulse height derived from the amount of light that was extinguished from the illumination source (extinction) as is measured at a detector, or the amount of light that was scattered away from the beam in the forward direction (however detected) could be mapped to a diameter—often thought of as the diameter belonging to an equivalent cross-sectional area of a sphere—as the absolute shape of the particle could not be determined by this method. Calibration of the size (diameter) detected and verification of the method is accomplished with the use of precisely sized polystyrene (or other composition) spheres—commercially available—and size verified by microscopy techniques.

The industry understands the weakness of this method, only giving equivalent diameters, and uses other imaging techniques to gather the missing information, if needed. However, the ability to analyze a reasonable volume of sample in about one minute of analysis time and collect sufficient statistics as to be certain of the character of the sample, makes this a powerful technique, and is used in many fields.

Nature makes it difficult to squeeze light into a small space, and make it uniform across a long enough region to usefully interact with practical samples. Thereby limiting the smallest possible size one could individually detect and still have that one to one relationship with size.

Advancements in the field of particle size detection (U.S. Pat. No. 6,794,671 for Sensor-Design; U.S. Pat. No. 7,127,356 for an Algorithm; U.S. Pat. No. 7,496,463 for Baseline-Auto-Adjust), include the use of a parallel laser beam of small diameter to illuminate a tinier region than the usual slice of light traditionally used in SPOS (limited by the behavior of light and the optics used) and to algorithmically reconstruct the particle size distribution after the pulse height statistics collection, since this method breaks the linear relationship of pulse height to particle size. A smaller column of light allows one to detect smaller diameter particles because the fraction of light removed from the probe beam (in relation to the total intensity of the probe beam) is kept to a higher ratio, and their signal stays above the detection limit. In other words, by keeping the ratio of the particle cross-sectional area to the cross-sectional area of the probe beam as high as possible pulses are created above the detection limit for much smaller particles than is possible by intersecting such particles with the traditional slice of light as used in SPOS techniques who's cross-sectional area at the interaction zone is much larger than a round and collimated pencil like beam.

This technique and algorithm require Gaussian illumination of the probe beam traveling in a parallel direction perpendicular to flow as particles traverse the sensing zone of a flow cell.

However, both the type of illumination required and the need for parallel transversal through the flow cell create limitations to this technique and algorithm. The math used in the algorithm only works for Gaussian illumination (a type of illumination that lasers in TEM00 mode exhibit, where TEM=Transverse Electromagnetic Mode.)

The limitation of the prior technique is that the detection of smaller diameters comes at the cost of losing the one-to-one relationship of each particle's detected pulse height to its diameter, and having to use a parallel beam through the flow cell, limits the smallest diameter beam that can be used within practical dimensioned flow cells. Additionally the algorithm uses the tallest channel in the Pulse Height Distribution (PHD) of a mono-sized population to position the PHD vector in its deconvolution matrix, ignoring the populated, but smaller in height channels, formed by taller pulses.

Another limitation of the prior art technique is that for any given incoming beam diameter as you attempt to focus a laser to an even smaller spot with a focusing lens, the depth of focus also shrinks the smaller in focus spot size you try to go. When the depth of focus becomes smaller than the flow cell width that is traversed by the beam, the algorithm used to convert single pulse height to an individual particle diameter fails and it no longer provides a way to correctly correlate pulse height to diameter.

Thusly, there is a need for a particle sizing method that is viable for and sensitive to smaller diameters, using light that is focused as tightly as possible only limited by nature. This is achieved by using non-parallel and non-uniform illumination in the direction of the light travel within the sensing region of the flow cell. The technique described in this patent allows for the use of light focused as tightly as possible (diffraction limit) for any given hardware, and it also allows for the use of multiple light sources and complicated illumination fields—including folded and reflected light—or any irregularities in the probe beam such as results from imperfect optical elements and imperfect probe beams.

SUMMARY

It is the object of this invention to provide a high resolution and high concentration particle sizing methods than is currently not possible using previous techniques.

The particle sizing method of the current invention allows for actual sizing of particles using pulse height detection from a sensor by utilizing non-parallel and non-uniform illumination within the sensing region of the flow cell. The ability to measure particles at the sub-micron dimensions one at a time is achieved by focusing the laser beam to the point where the beam is no longer uniform and parallel in the direction of the light travel within the flow cell.

In order for the method of the current application to utilize a beam diameter and focus elements where the depth of focus is smaller than the flow cell width, a new, novel, method of deconvolution was developed.

The deconvolution process requires the sensor to be characterized using multiple histograms that are collected during the calibration phase of the sensor. Once the sensor has been characterized, the process of deconvolution after a data collection run, recursively eliminates the expected statistical contribution to the histogram in all the lower channels from the highest particle height detected and repeating this for all remaining channels in the pulse height histogram, removing the contributions from largest to smallest channels. The logic followed is that pulses in the histogram channel representing the strongest detected signal, could have 'ONLY' come from the brightest part of the illumination zone for any given particle diameter. The remaining lower intensity channels (in the same histogram) are populated with pulses originating within the detection zone, but away from the brightest spot. The whole histogram being one of the characterizing histograms for a particular diameter probe-particle collected during the calibration process of the sensor. Since 'Brightest Spot' is not limited to being generated by a uniform and circular beam—this technique works for all sorts of shapes in the illumination field—since there will be 'A Bright Spot' somewhere within the illumination field, and all other positions will by definition have a lower intensity (and resulting is less tall pulses at the detector). It is noted that this method results in histograms where the channel with the most counts need not be the channel with the tallest pulses and often is not. The channel with the most counts in the histogram is often produced by other (less intense) Illumination regions within the sensing zone where a larger fraction of the probe-particles traverse.

Once the deconvolution process is complete, the resulting output is a particle size distribution (PSD). Peaks in the particle size distribution are located at channel numbers that are not yet representative of a size. Transformation of the channel number to a specific particle size is achieved using a calibration curve—whose mapping of channel number to diameter has been previously determined during the calibration phase of the sensor. The particle sizing method of the current invention allows for single particle size detection and measurement below 100 nanometers within practical flow cells.

Since particles are detected from such small volumes in relation to the volume of the flow cell in the region of the sensing zone, an additional correction needs to be applied in order to recover the concentration (particles per unit volume) of the colloidal suspension. During the calibration phase of the sensor—a table is constructed that records the fraction of particles detected at a particular diameter, and this information is used to calculate the concentration of the suspension after a data collection run. This is the detector efficiency at a given size (see detector efficiency FIG. 3).

BRIEF DESCRIPTION OF THE DRAWINGS

FIG. 26 illustrates a schematic of an optical scheme typically used in the eighth alternate embodiment of the current invention;

DETAILED DESCRIPTION OF THE INVENTION AND PREFERRED EMBODIMENT

Figure 1:
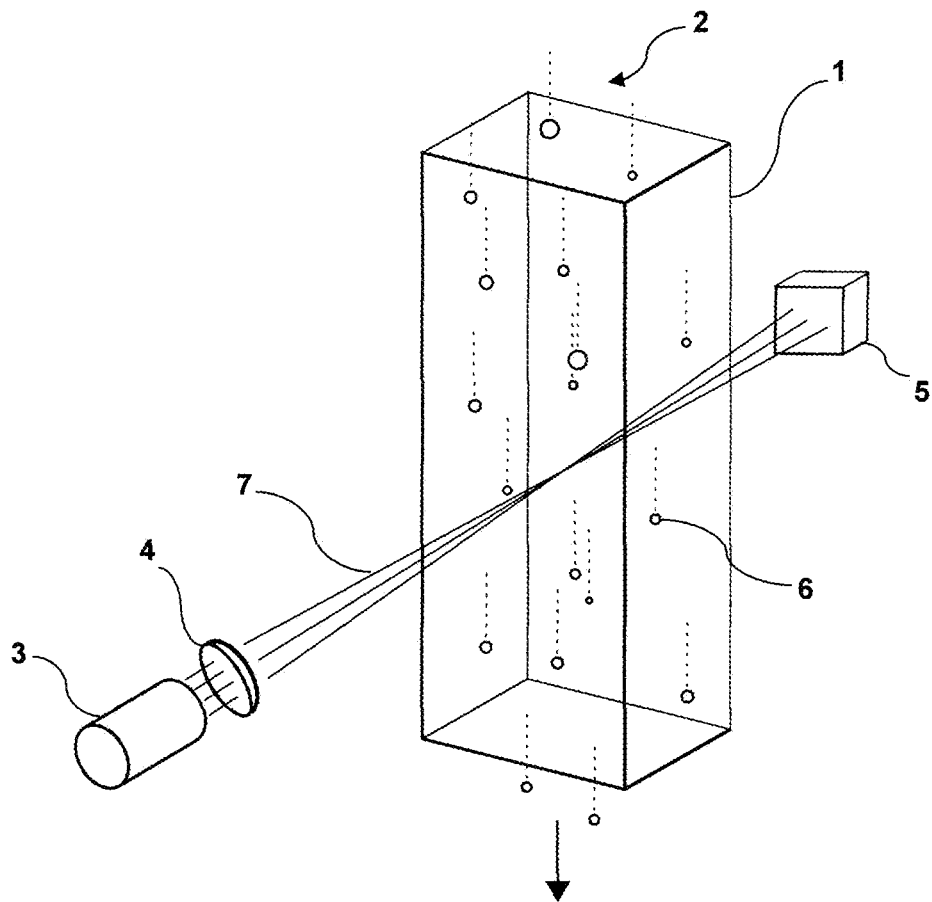
FIG. 1 illustrates a schematic of the prior art optical scheme typically used in the preferred embodiment of the current invention and conventional prior art light extinction sensor.

Referring to FIG. 1, the equipment arrangement for the preferred embodiment to perform the particle sizing method of the current invention comprises a flow channel 1 through which a colloidal suspension 2 is traversing, an illumination source 3, a focusing lens 4, a detector 5, and a current to voltage converter (not depicted), a means of causing the colloidal suspension to traverse the flow cell such as a pump (not depicted), and associated collection electronics (not depicted).

The flow channel 1 of the preferred embodiment allows light from the illumination source 3 to pass through a focusing element 4, enter the flow channel 1, come to a focus in the center of the colloidal suspension 2 and exit the other side of the flow channel 1 to the detector 5 utilizing transparent walls though which the laser beam 7 can transverse. Flow channels 1 for fluid samples are typically made of quartz glass, but any transparent material that forms a flow channel 1 works. The material composition of the flow channel 1 is usually chosen to be compatible, and not chemically interacting with, the colloidal suspension 2.

As known to those practiced in the art, the internal dimensions of the flow channel 1 are chosen in such a way as to maximize certain data collection parameters, as benefits the measurement. For instance, squeezing flow through a narrow flow channel 1, helps with high concentration colloidal suspensions 2, making it easier to get a particle 6 alone in the sensing zone 8, and thus tabulated by the electronics, at the cost of higher particle velocity (shorter measurement time), and the possible clogging of the flow channel 1 due to the narrowness of the flow channel 1. Whereas a wide channel 1 helps with not clogging the flow channel 1 and easier cleaning, at the cost of lower concentration in the measurement. When the transporting fluid is air or an inert gas, the flow channel 1 can include simple windows in order to protect the optics from contamination and enable easier cleaning. In-between measuring one sample and the next one the user usually flushes the flow channel 1 out with particle free compatible liquid. This is done in order to minimize contamination from one sample to the next.

For practicality, flow channels 1 have to be large enough so as to not clog when exposed to a colloidal suspension 2. There are times the flow channels 1 must be cleaned by either, or both mechanical means and chemical means as some samples can be nasty and harsh on cells. There is a practical lower 'width' one can make a flow channel 1 so as to avoid clogging by the colloidal suspension 2, and that a pump can push the colloidal suspension 2 through, and enough volume of the colloidal suspension 2 can be processed in reasonable time in order to collect useful statistics.

The colloidal fluid suspension 2 is comprised of a mixture in which one substance of dispersed insoluble particles 5 is suspended throughout a transport fluid substance, but not chemically interacting with it. Typically the particles 6 are comprised of various sizes. The transport fluid substance is sufficiently transparent or translucent to allow light to travel through the colloidal fluid suspension 2 as it travels through the flow channel 1.

The illumination source 3 of the preferred embodiment is a laser beam 7. Since monochromatic light can be focused to a smaller spot, and lasers are the illumination of choice for monochromatic light, this invention is best advantaged using a laser beam 7. However, this can be achieved through multiple embodiments known to those skilled in the art. Alternatively the illumination source 3 can introduce light into the apparatus through an optical fiber, or two fibers can be positioned facing each other at close proximity inside the fluid flow, requiring no focusing lenses, where one fiber brings light into the illumination zone 10, and the other fiber removes light from the sensing zone. Even though no focusing need be present with fibers, the sensing zone 8 is a volume made from the intersection of the illumination zone 10 and the volume where sufficient signal strength is generated and is detected.

The mathematics of recovering the Particle Size Distribution (PSD) from the Pulse Height Distribution (PHD) as introduced in this patent, applies to all manner of illumination 3, not just monochromatic light. The PHD for polychromatic light will be different from mono-chromatic light for a given particle diameter, beam 7 diameter, focusing lens 4 and flow channel 1, however the PSD will be the same.

Figure 2:
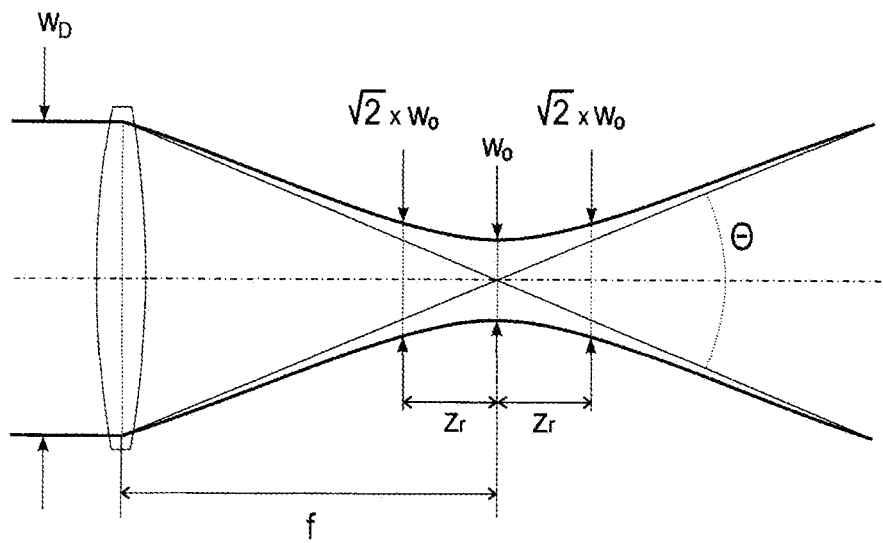
FIG. 2 is a diagram depicting the behavior of light passing through a focusing lens and through the region of focus.
Figure 7:
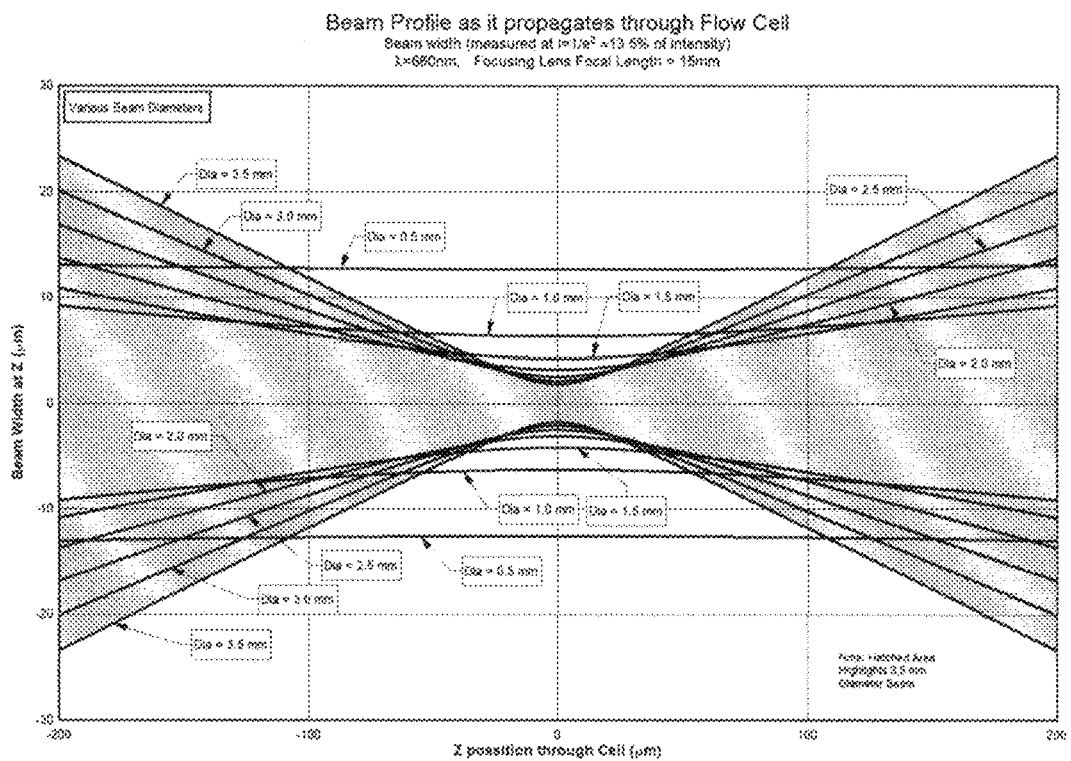
FIG. 7 depicts various beam profiles as each beam propagates through a flow cell, while holding illumination wavelength and focal length of focusing lens constant.
Figure 8:
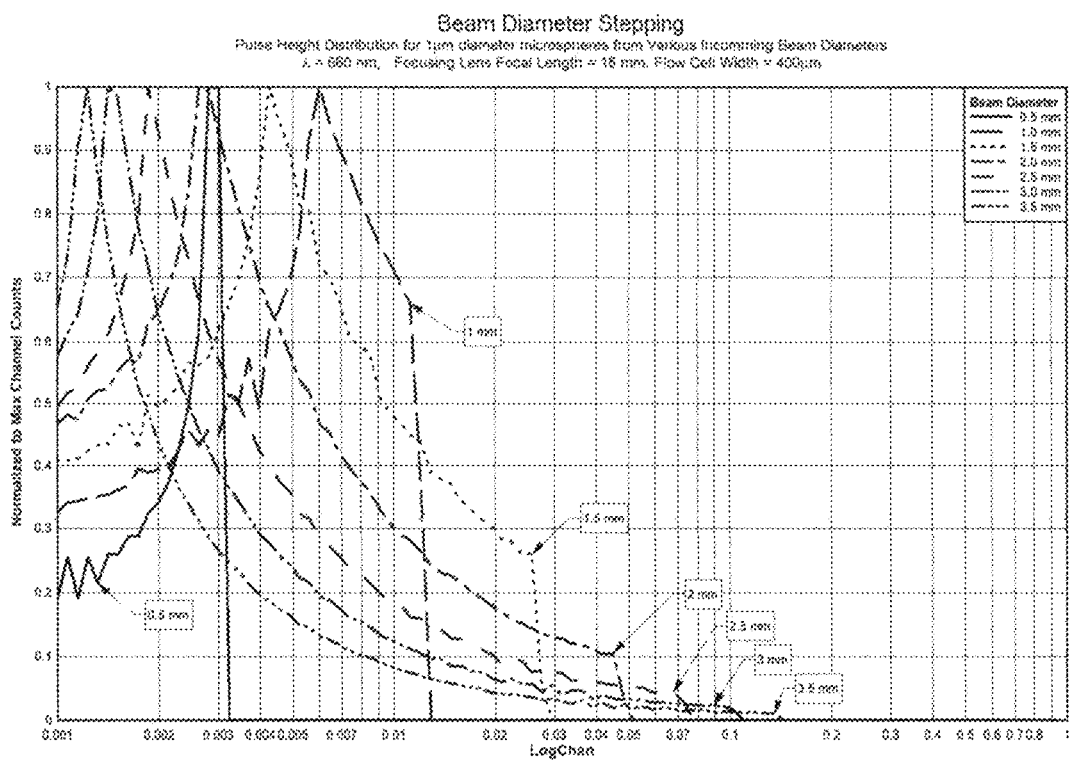
FIG. 8 depicts the effects on the Pulse Height Distribution collected, for various Beam Diameters, while holding particle diameter, illumination wavelength, and focal length of focusing lens constant.

The focusing lens 4 of the preferred embodiment focuses the light source 3 to a spot, typically utilizing a focusing lens 4 composed of a single optical element or multiple optical elements. To help with the detection of smaller particles 6, a smaller spot focus inside the detection zone can be achieved by using a wider source laser beam 3 and/or a shorter focal length lens 4. The relationship between wavelength of light, focal length of lens, and width of incoming illumination beam having the form of EQN 1 is depicted in FIG. 2, where $W_0$ is the width at best focus, $\lambda$ is the wavelength of light, f is the focal length of the focusing lens 4, and $W_0$ is the width of the incoming beam 7. The depth of focus, having the form of EQN 2, as measured from the points where the beam width is $\sqrt{2} \cdot W_0$ on either side of the best focus point. FIG. 7 depicts the profiles for various diameter beams 7 as the light travels through the flow cell 1. At small spot sizes, the depth of focus is too short and is completely inside any usable flow channel 1, therefore it required a new approach to deconvoluting the pulse height distribution into a size distribution. The previous technique breaks down, and you no longer get a usable answer.

$$w_D = \frac{\lambda f}{\pi w_0} \qquad \text{EQN 1}$$

$$2Zr = \frac{8\lambda f^2}{\pi w_D^2} \qquad \text{EQN 2}$$

The detectors 5, 106 of the preferred embodiment are typically photo-diodes. The detectors 5, 106 are fast enough in response and usually cover the range of light frequencies of the illumination source 3. They are used in a scattering or extinction configuration, and often simultaneously applied to the same sensing event. Extinction is when all the light from the illumination source 3 is captured at the detector 5, and the detection event is the measure of the amount of light removed from the light path because of a particle 6 passing through the sensing zone 8. Scattering detectors capture photons that are diverted from their forward path, due to interaction with the particles 6 in the sensing zone 8 and are diverted to any series of angles away from the forward direction they were traveling. Scattering detectors can be in many configurations and capture various scattering angles both in the forward or backward scattering direction. Any other extinction detector 5 and/or scattering detector 106 capable of capturing and measuring the intensity of scattered light or the reduction in beam intensity and responding fast enough to a sensing event in the flow channel 1, can serve the purpose of providing signal to the collection electronics.

The colloidal suspensions 2 to be measured can be transported through the flow channel 1 utilizing pumps to generate the motive force. Any means of transporting a colloidal fluid 2 suspension through said flow channel 1 can be used. Those skilled in the art can use a pump, gravity, pressure, vacuum, or other means of transporting the colloidal suspension though the flow cell. A pump is often preferred because a pump can have predictable flow rates which help in the sample concentration calculation. The fluid suspension is transported through the flow channel 1 at velocities that the interaction with the probe beam generates signal that is within the design parameters of the detector 5.

Figure 11:
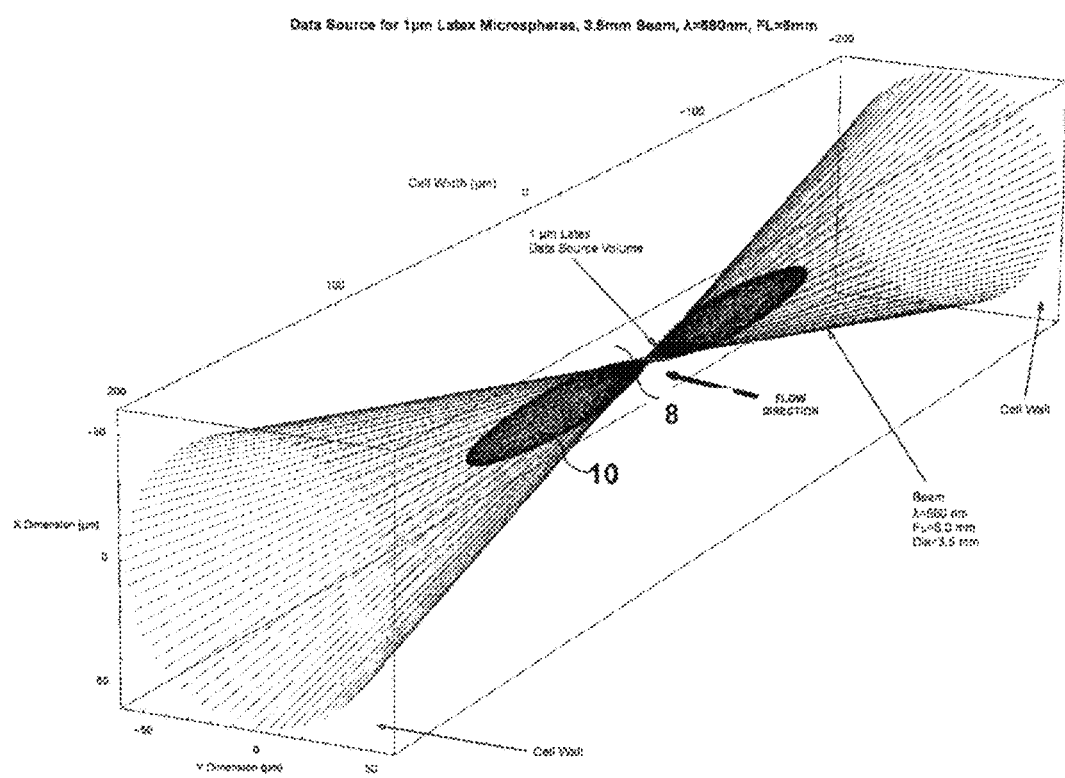
FIG. 11 is a three-dimensional depiction the illumination zone and the sensing zone inside a flow channel.
Figure 12:
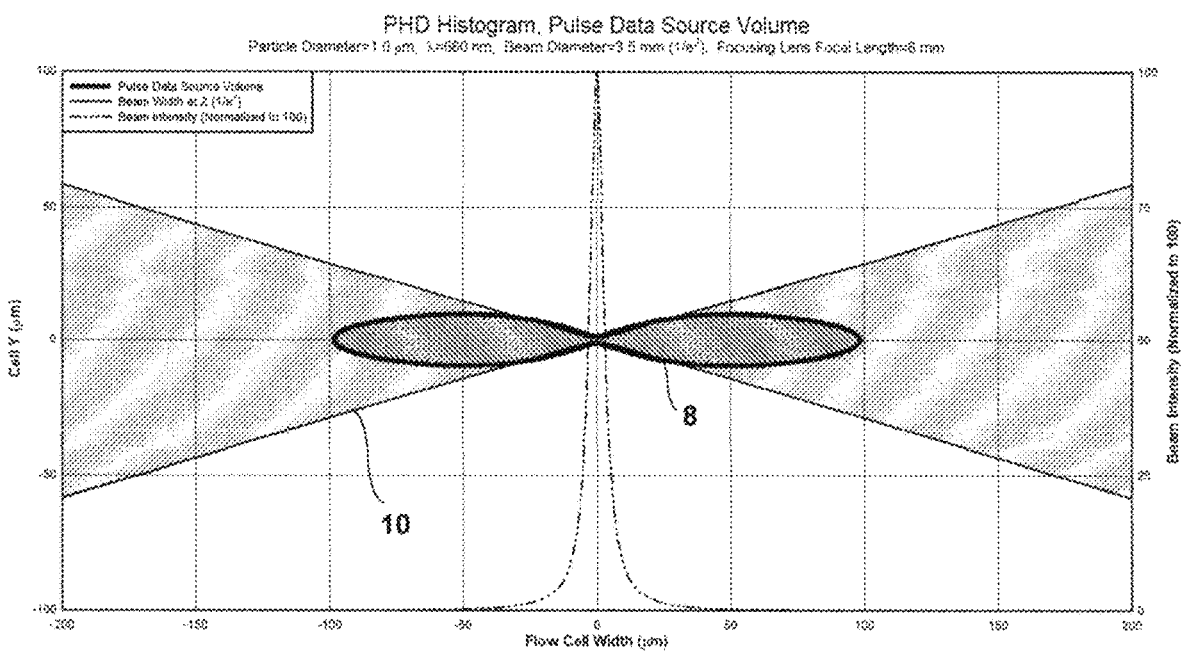
FIG. 12 is a cross-section of the illumination zone and the sensing zone inside a flow channel.
Figure 13:
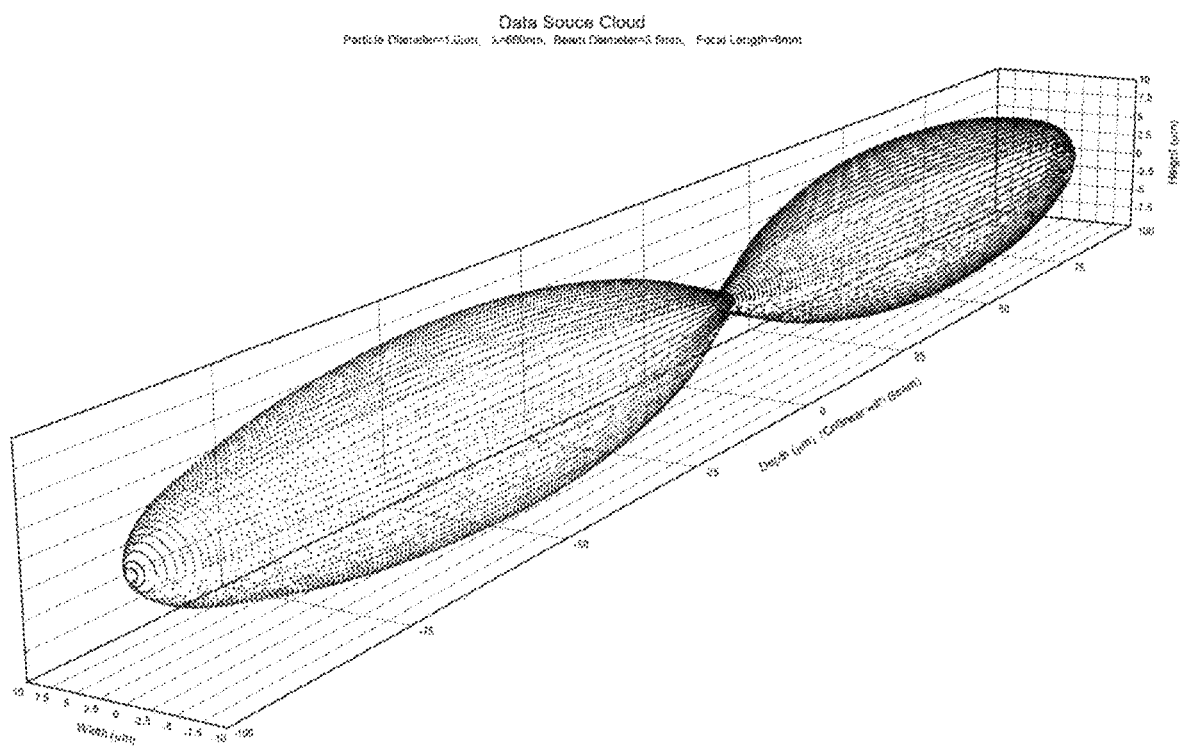
FIG. 13 is a three-dimensional close-Up view of the sensing zone for one particular configuration of beam diameter, wavelength of light and focusing lens focal length.

The sensing zone 8 is the portion of the illumination zone 10 inside the flow cell that generates signal seen at the detectors. When the number of particles detected at the sensing zone are ratioed with the concentration of the sample, this determines the visibility fraction of the sensor for a given particle size, and if this computation is done for each size in the PHD histogram an efficiency curve is generated for the sensor. This is done during the calibration phase of the sensor and used in the data collection phase to report the concentration of the sample just measured. A typical sensing zone 8 is created by introducing a focusing lens 4 in the path of a collimated laser beam 7 and locating the point of best focus inside the flow channel 1 of a transparent flow cell and having detectors 5 of sufficient sensitivity to record the interactions of the light with the flowing particles. FIGS. 11, 12 and 13 depict the illumination zone 10 and the sensing zone 8 inside a flow channel 1.

Figure 3:
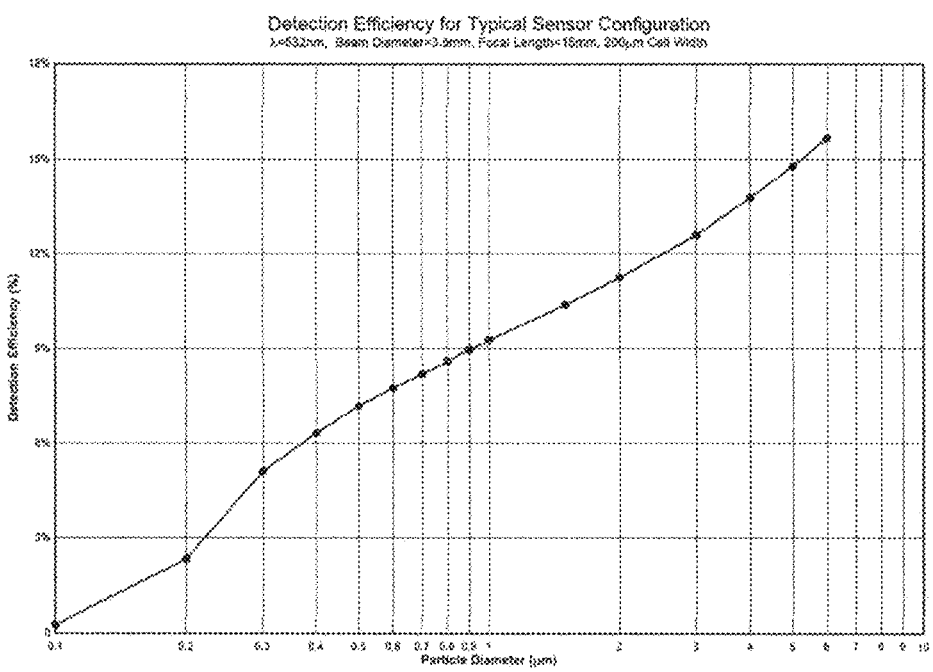
FIG. 3 is a graph depicting the detection efficiency for various particle sizes in a colloidal suspension for a given sensor configuration.

Knowing the visibility fraction for a detector 5 and for a given diameter, one can calculate the concentration of the measured colloidal suspension 2 at this diameter. One would do this calculation for all particle 6 diameters measured to derive the concentration of the source fluid. FIG. 3 depicts a typical graph depicting the detection efficiency for various particle sizes in a colloidal suspension 2 for a given sensor configuration.

Figure 4:
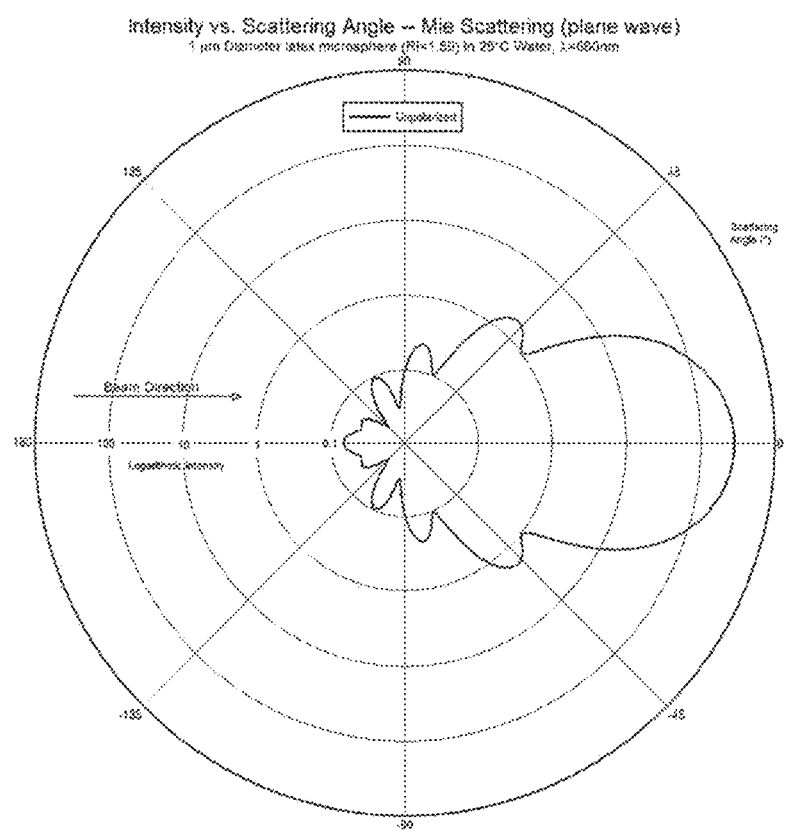
FIG. 4 is a graph depicting the signal intensity at various scatter angles for a given particle size.

The signal that is sensed at the detector 5 is generated by the interaction of the light that arrives into the illumination zone 10 from an illumination source 3, interacting with a colloidal fluid suspension 2 particle 6 passing though the illumination zone 10 at a particular point in time, as it is transported by a carrier fluid. The light interacts with a particle 6 and 'scatters' in all directions around the particle 6. The detector 5 that is looking at the laser beam 7 head-on, the Extinction Detector, senses this as light removed, and it reports the intensity as dipping in value, whereas a detector 106 placed off-axis to the laser beam 7 and shielded from the illumination coming from the beam, the Scatter Detector, whether in the forward direction (forward scatter 505), or in the reverse direction (back scatter 405), reports an increase in intensity. The intensity of the reported signal, in either case, contains information about the diameter of the particle 6. FIG. 4 is a graph depicting the signal intensity at various scatter angles for a given particle size.

Figure 5:
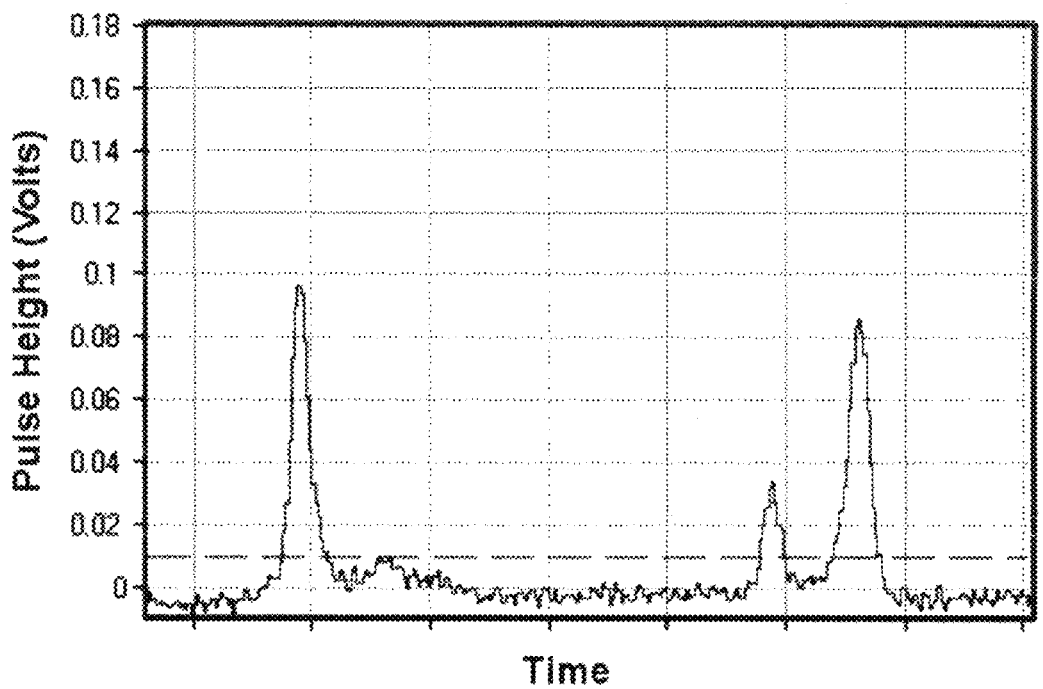
FIG. 5 is a chart of signal intensity vs. time and the resulting pulses from a scatter detector as a colloidal suspension travels through the flow cell.
Figure 6:
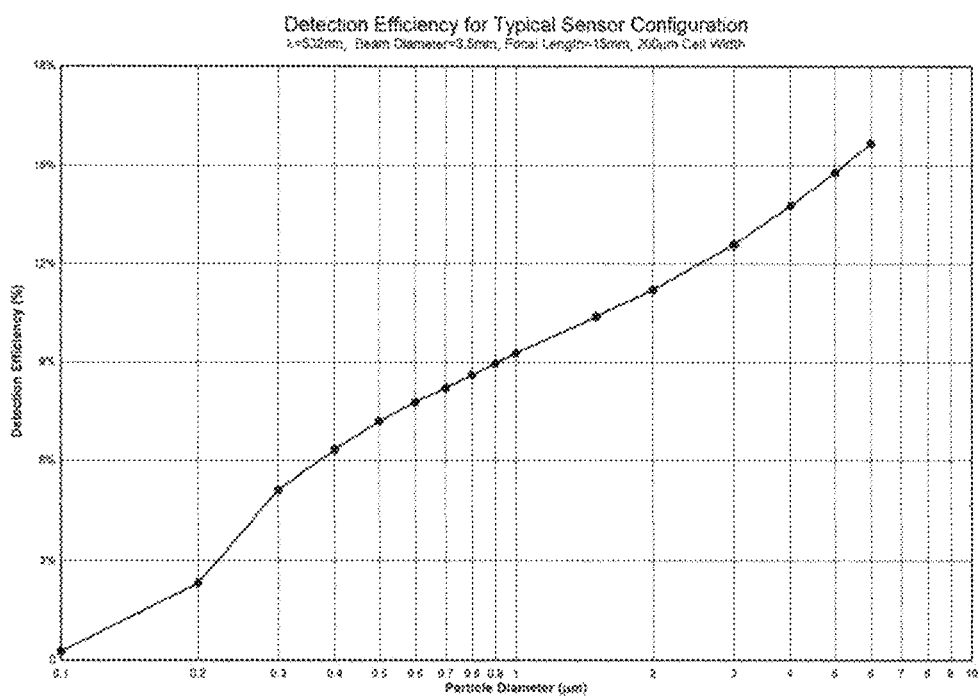
FIG. 6 is a chart of signal intensity vs. time and the resulting pulses from an extinction detector as a colloidal suspension travels through the flow cell.

Signals from the extinction or scattering detectors 5 are often processed via an Analog to Digital Converter, converted to a digital form and then stored and processed inside suitable computing hardware. The traversal of a particle 6 through the sensing zone 8 generates a pulse that the collecting electronics, measures the pulse height and other parameters, and then tabulates the values in various histograms. The histogram of pulse heights is the pulse height distribution (PHD) that then gets processed further in the deconvolution algorithm to recover the particle size distribution (PSD). Besides digital processing, pulse heights can also be discriminated by analog circuit means, but the histogramming of any resulting pulse heights requires the use of digital hardware. FIG. 5 is a chart showing the voltage of detected pulses as a colloidal suspension travels through the flow cell using a Scatter Detector 106. FIG. 6 is a chart showing the voltage of detected pulses as a colloidal suspension travels through the flow cell using an Extinction Detector 5.

Figure 9:
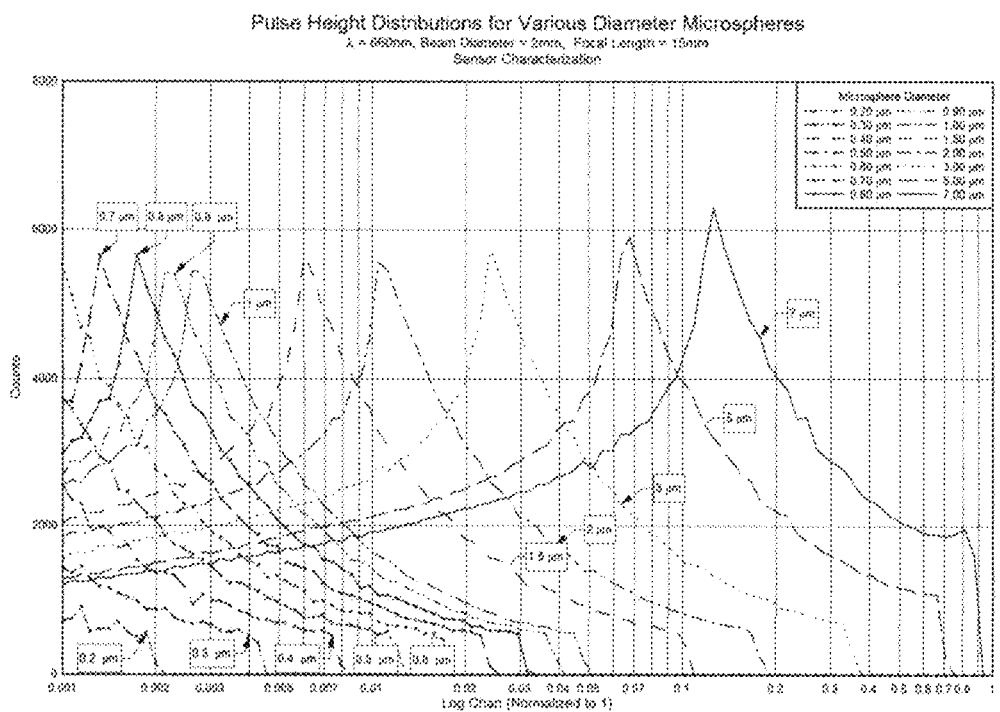
FIG. 9 depicts the various Pulse Height Distributions generated by various particle sizes, while holding beam diameter, focusing lens focal length, wavelength of illumination source and flow cell dimensions constant.

Referring to FIG. 9, to perform the particle sizing method of the current invention a collection of curves that characterize a sensor is generated. All parameters are kept constant and particle size is stepped, so that response curves for each size is collected. Knowing the behavior of such a sensor for all diameters in its detection range, provides data necessary to deconvolute a pulse height distribution collected from an arbitrary colloidal suspension, into a size distribution.

For a given sensor configuration, multiple histograms are collected during the calibration phase of the sensor. Each histogram represents a mono-sized colloidal population of known size. During the calibration phase a sensor is characterized, and the data collected represents a pulse height distribution calibration curve for this sensor.

Sensor characterization can be done experimentally or via computer simulation. If done experimentally with size-traceable mono-sized particle standards of known concentration, the experiment will also simultaneously derive an accurate calibration curve for the thusly constructed sensor, along with its associated efficiency data. The process of characterization of a sensor also produces a useful calibration for the sensor where channel number in the histogram can be correlated to size.

Figure 14:
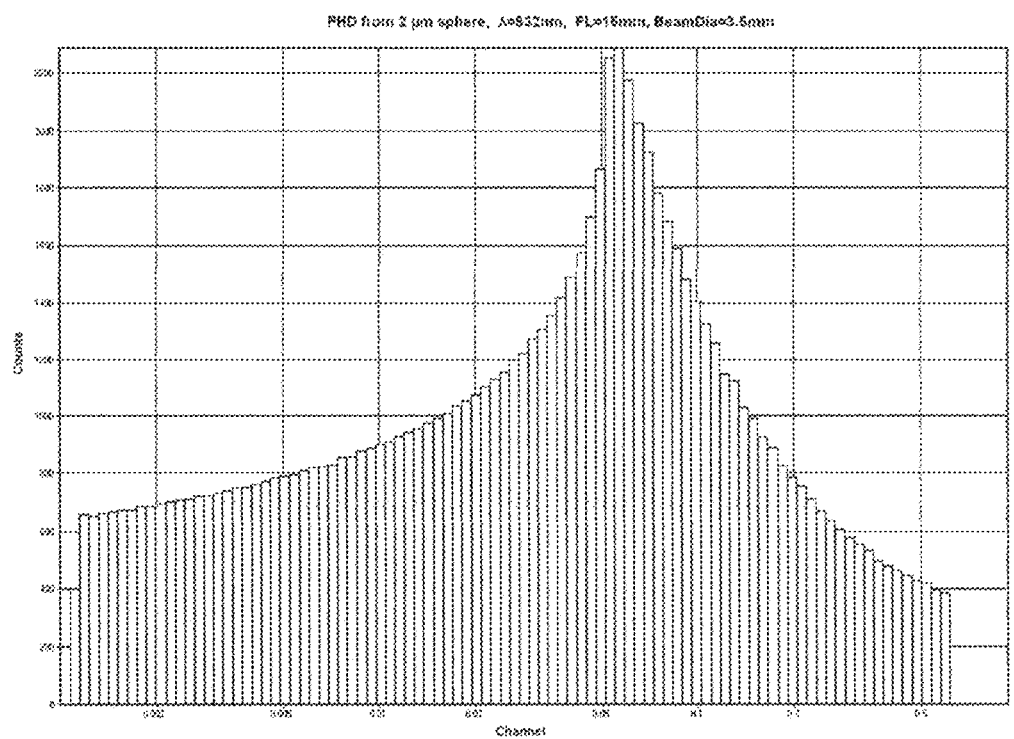
FIG. 14 is a graphical representation of a pulse height distribution calibration curve representing the signature resulting from a mono-sized particle population, and a particular sensor configuration.

Referring to FIG. 14, for a pulse height distribution calibration curve, there is an upper most channel (right most channel in the graph referenced above) where there are no counts beyond that channel. This happens because any given mono-sized population can only generate a pulse of maximum size (volts) when the particles pass through the center of the brightest spot in the illumination field. In this curve, the right most channel with counts greater than zero becomes the anchoring channel that selects where this curve will be used in the deconvolution process, in other words, the right most channel becomes the channel that defines the curve position, with the relative height of that channel (in respect to total counts) containing useful information as to the relative contribution of every other channel in any unknown PHD. Each channel in the histogram has such a characterization curve assigned to it. For channels that have no curves measured or computed, the process of interpolation and extrapolation can be used to fill in from known adjacent curves.

If the colloidal concentration (particles per unit volume) of the introduced mono-sized sample is known at the time of characterization, then an efficiency factor for that mono-sized sample can be also be computed and saved in the sensor characterization database, to be used during a future run to calculate the concentration for this diameter in the sample under test. This is possible since knowing the concentration of the mono-sized population during characterization, and the physical dimensions of the flow channel, one can determine the ratio of what is visible (counted) and what was computed to be present during the data collection period. This step is optional and provides additional concentration information if it so desired.

Figure 10:
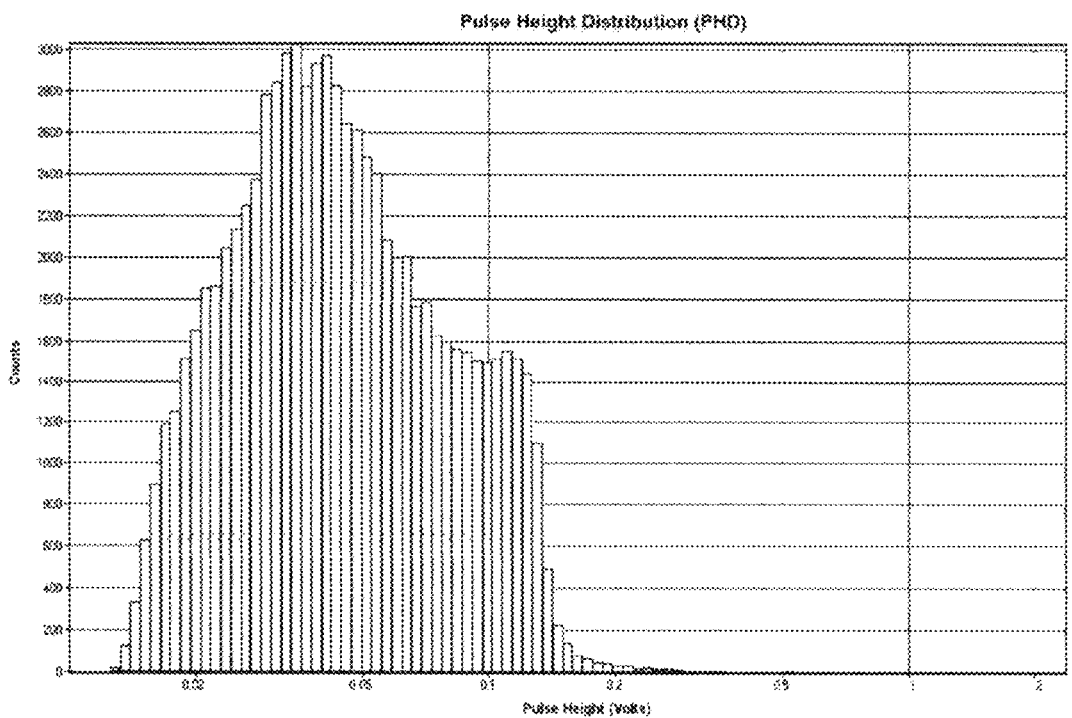
FIG. 10 depicts a Pulse Height Distribution (PHD) histogram of the pulse heights seen during a data collection session, tabulated according to their height, measured in volts, displayed in the graph above as Counts vs. Pulse Height.

Once a sensor configuration has been characterized and the pulse height distribution calibration curves have been generated (the sensor is deemed to be calibrated), one would then run a colloidal suspension to be analyzed through the equipment arrangement for the preferred embodiment, known as a data collection session. Referring to FIG. 10, the output from the equipment arrangement is a histogram of the pulse heights seen during a data collection session, tabulated according to their height (measured in Volts), displayed in the graph as Counts vs. Pulse Height.

Figure 15:
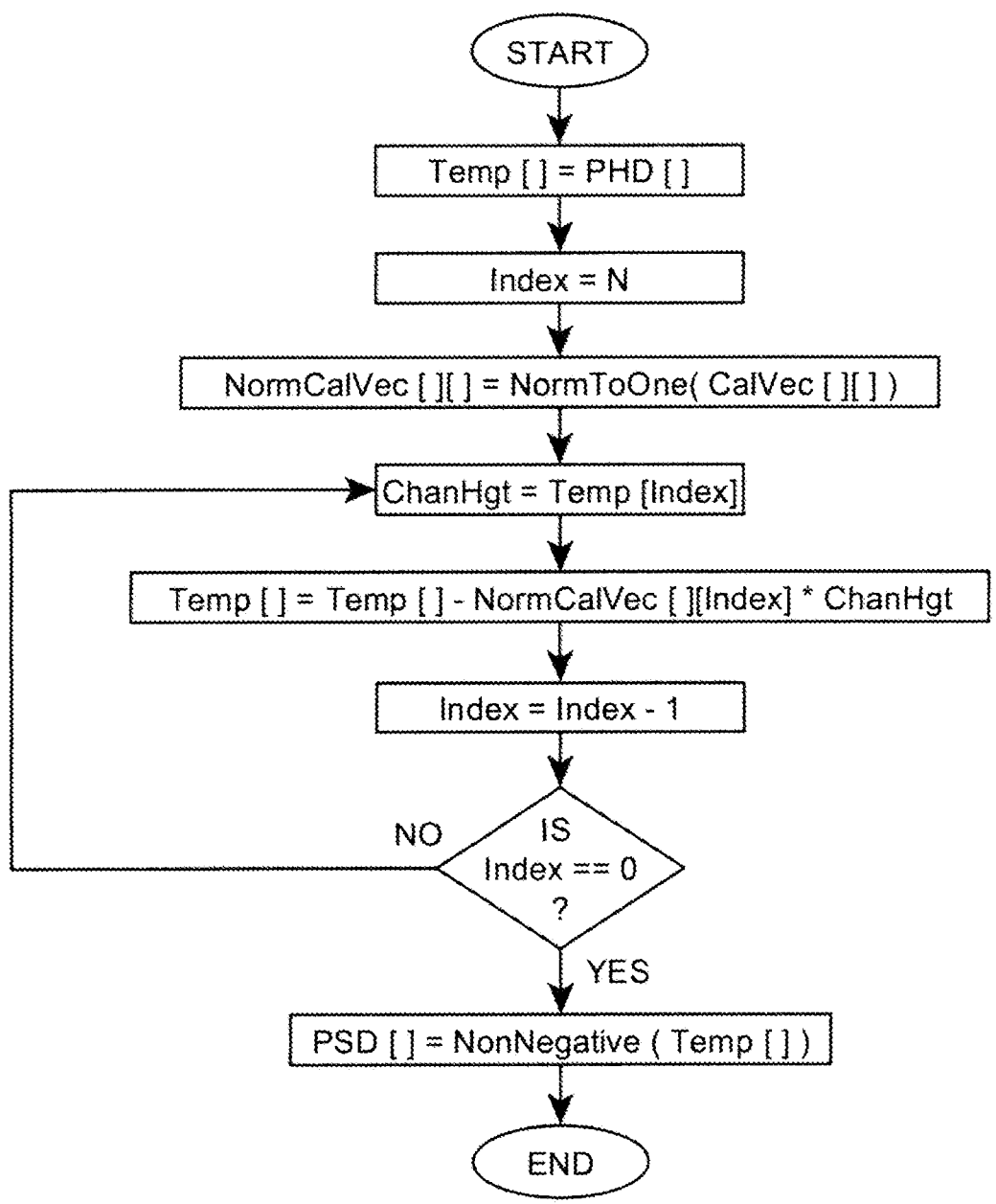
FIG. 15 is a flow chart of the deconvolution algorithm to convert a pulse height distribution to a particle size distribution.

Referring to FIG. 9, the process of deconvolution is completed by recursively eliminating the expected statistical contribution to the PHD histogram in all the lower channels from the highest particle height detected, and repeating this for all remaining counts in the pulse height histogram, removing the contributions from largest to smallest channels. Referring to FIG. 15 the deconvolution process is completed by first examining every channel one at a time in the collected PHD, starting with the 'right most' channel (in other words, the histogram channel that represents the tallest pulses tabulated). From this, the calibration curve representing that channel is retrieved from memory, and the height of the collected PHD channel is multiplied with every element of the calibration curve for this channel, thus producing a new PHD histogram of the expected contribution to the collected PHD for this diameter particle. Note, the calibration curve has previously been normalized to a value of one (1.0) at the channel that it represents (defining channel—ie. the upper most channel with counts in it)—with all other channels taking on relative counts in relation to the defining channel (this is the NormToOne(Calvec[ ][ ]) step in FIG. 15).

Following this step it is known what the contribution in counts was into the collected PHD from all the channels from a particle this size. Once determined, subtract this computed PHD for this size from the collected PHD, essentially eliminating from the collection the contribution of particles of this diameter. What is left behind after the subtraction is the contribution to the PHD from particles of smaller diameters. The height of the current channel in the PSD is established from the quantity of counts that were in the collected PHD histogram for this channel. This process is repeated for all channels going down to channel one, at the left side of the histogram (as seen in FIGS. 16 and 17), sequentially eliminating the contribution to the PHD from particles of various diameters.

The reason that this computation is done starting at the channel representing the tallest pulses and working toward the channels representing the smallest pulses, is that it can be definitively determined that the counts in the upper most channel (where counts are present) were derived from interactions of the largest particles in the colloidal suspension and the brightest portion of the illumination beam. What diameter particle created tallest pulse detected can be determined because the sensor has previously been characterized. The characterization spectrum of a sensor for any given mono-sized population is normalized to unity on the highest channel containing counts, since that is the only channel that which is known how the counts got there (from the brightest spot in sensing zone) during the deconvolution process. For every channel smaller than this it cannot be determined if a pulse was generated by a particle passing through the brightest portion of the illumination zone, or an even bigger particle passing through a section of the illumination zone where the intensity is lower. This 'pealing of the onion' from a position in the PHD where one can proportionally remove the counts introduced by the lower channels during the analysis to know exactly how the pulse height got generated for that channel, and computationally going to a lower channel where it cannot be determined what size particle generated the captured pulses that were tabulated into that channel—is the algorithmic deconvolution of the PHD into a PSD.

Figure 16:
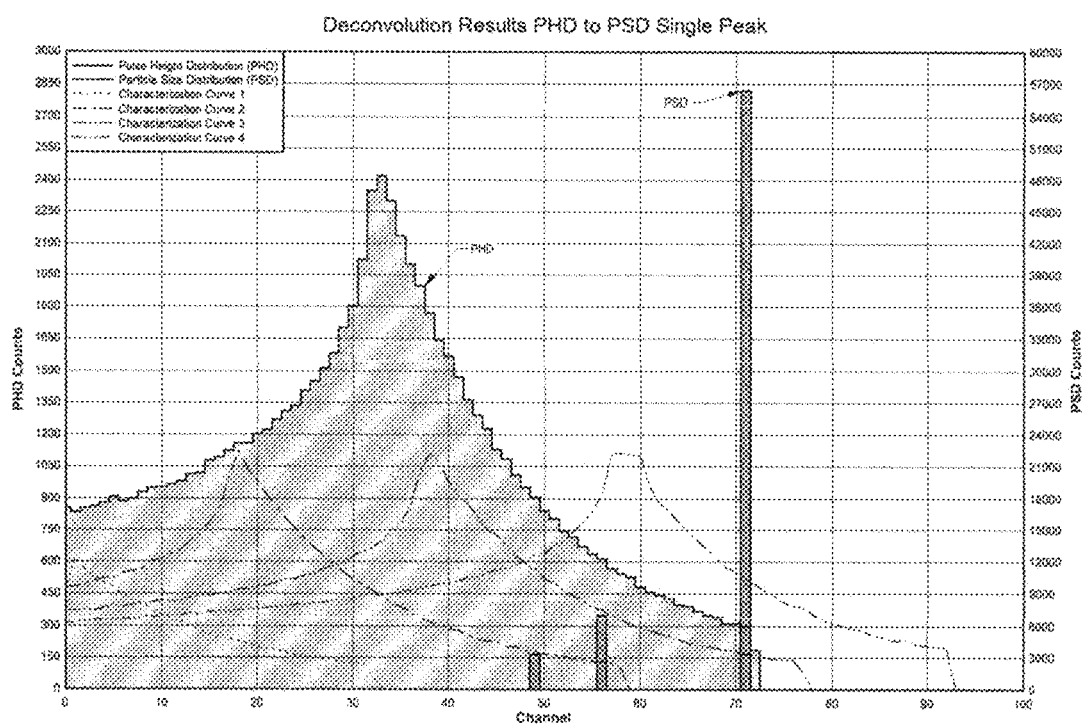
FIG. 16 is a graphical representation of a pulse height distribution (PHD) calibration curve, and the resulting particle size distribution (PSD) for one mono-sized population, with four of the sensor calibration curves also represented.
Figure 17:
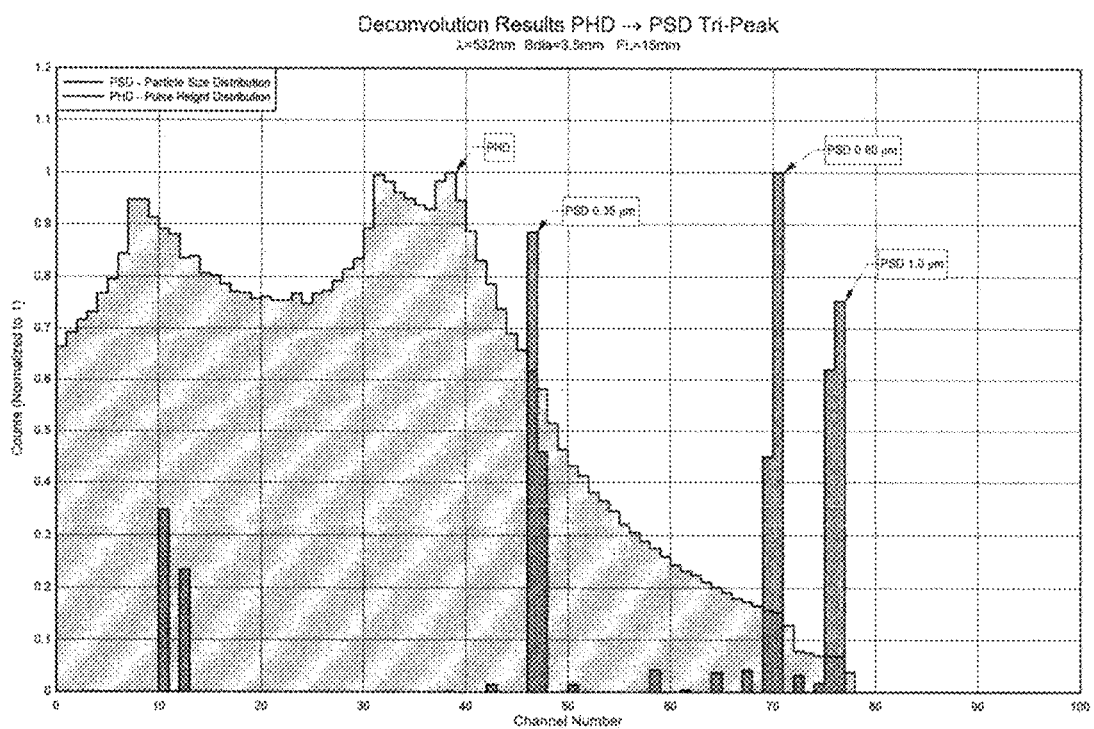
FIG. 17 is a graphical representation of a pulse height distribution (PHD), and the resulting particle size distribution (PSD) for three mono-sized populations in colloidal suspension.
Figure 18:
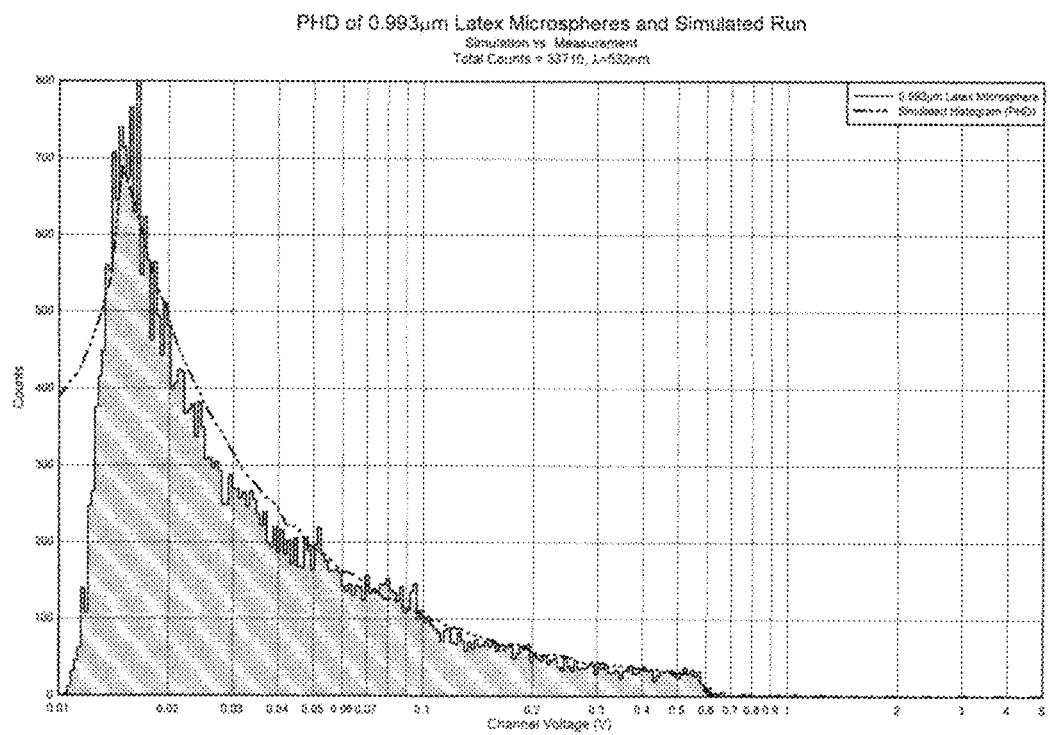
FIG. 18 is a graphical representation of experimental data collected for 0.993 μm diameter latex micro-spheres in comparison to a simulation of the same experimental conditions.

Referring to FIGS. 16 and 17, once the deconvolution process is complete, the resulting output is a particle size distribution (PSD). Peaks in the Particle Size distribution are located at channel numbers that are not yet representative of a size. Transformation of the channel number to particle size is achieved via an prior art industry standard calibration curve where the voltage representing a particle diameter of a particular size, is converted to a size by means of a look up table or function curve.

A limitation to the particle sizing method of the current invention is that the technique breaks down when there is an insufficient number of pulses detected to be able to deconvolute with confidence, especially if faced with a poly-dispersed sample. This is a problem of statistical uncertainty and confidence in the answer.

There is some art in deciding when enough pulses have been collected to accurately represent a colloidal population. In a mono-sized colloidal suspension a minimum of 10,000 events can accurately characterize the size of the particles—while counting in the millions (total PHD counts) just reinforces the confidence for the size initially detected. Run time limitations come into effect, where collecting data for a longer time does not produce any more information besides reinforcing the earlier answer and only improving the concentration statistics. In poly-dispersed colloidal suspensions 100,000 counts are a low minimum in constructing a spectrum and ideally counts in the millions in the PHD will improve the quality of the answer. The quantity of counts detected is a quality issue and it depends on the needs of the user as to how certain they need to be of what is being tested. Sometimes sample volumes are so small or samples are very dilute providing fewer counts that one would feel comfortable sensing, but such are the trade-offs of measurement.

The result of this limitation is that the sensors as described in this application are not useful in contamination monitoring where few large particles in the population are in need of detection and correctly sized. However, the particle sizing method of the current invention can still be used to bound the range of particle diameters observed, without providing a detailed PSD. A sensor of this type can still provide useful sample information if given enough data collection time when the sample is highly dilute.

Figure 19:
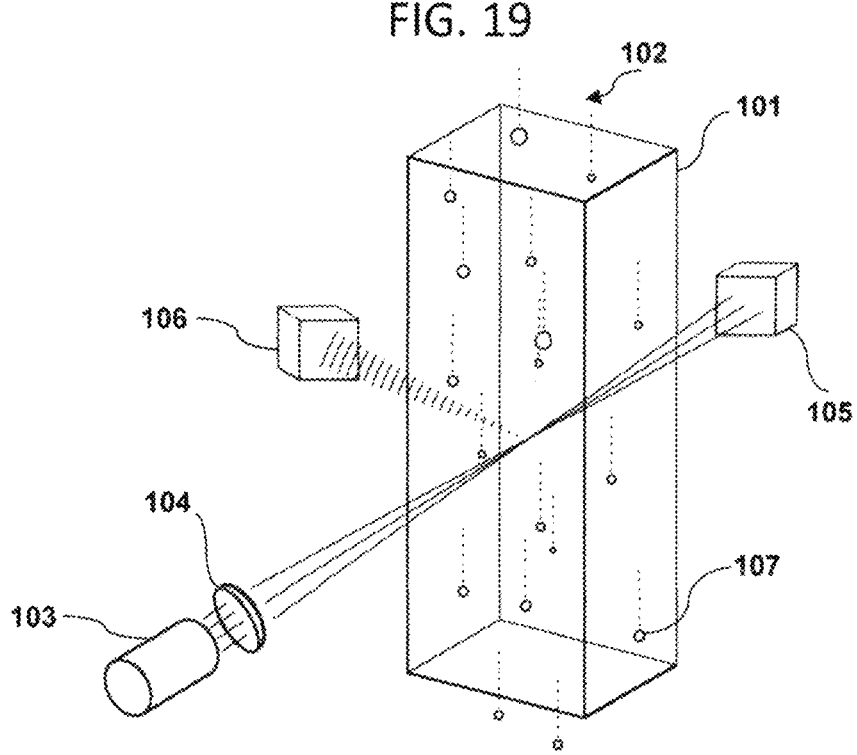
FIG. 19 illustrates a schematic of an optical scheme typically used in the first alternate embodiment of the current invention.

Referring to FIG. 19, a first alternate embodiment of the sensor is where light from an illumination source 103 is focused by means of a lens 104, through a flow channel 101, having the focal point positioned inside the flow channel 101, as a colloidal suspension 102 is traversing said flow channel 101, and a signal is generated from particles 107 flowing past the illuminated zone inside the flow channel 101 as they interact with the illumination zone. Two detectors 105, 106 are used, one 105 to capture signal that is extinguished from the illumination source 103, and a second detector 106 to capture signals that are generated by the light as it scatters off the traversing particles 107. Deconvolution from PHD to PSD is done via the same algorithm for both channels, adjusting for the fact that extinction pulses are negative going, whereas scattering pulses are positive going.

Figure 20:
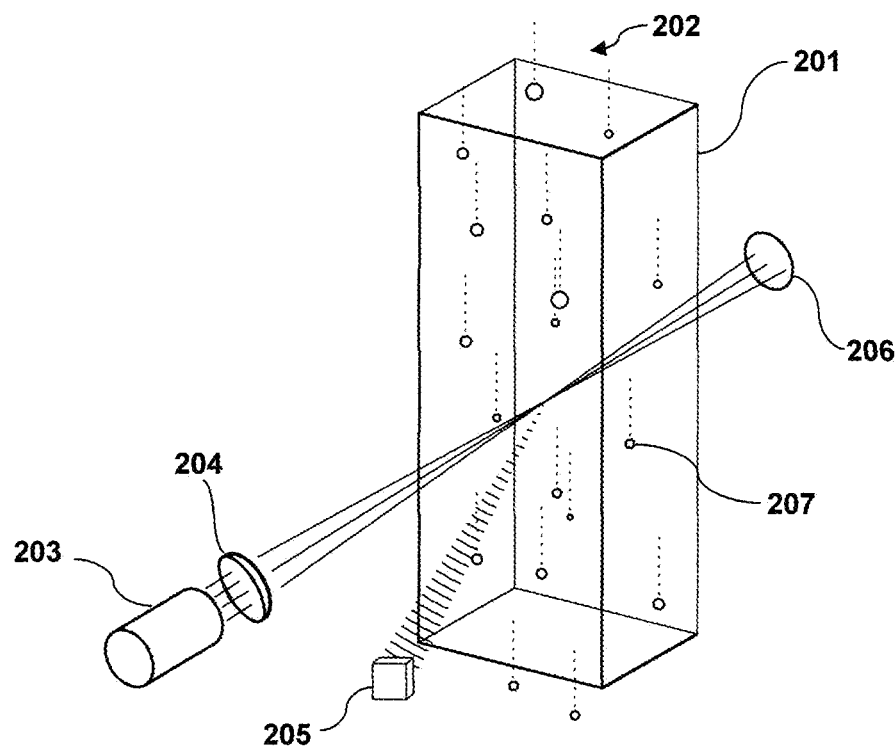
FIG. 20 illustrates a schematic of an optical scheme typically used in the second alternate embodiment of the current invention.

Referring to FIG. 20, a second alternate embodiment of the sensor is where light from an illumination source 203 is focused by means of a lens 204, through a flow channel 201, having the focal point positioned inside the flow channel, as a colloidal suspension 202 is traversing said flow channel 201, and a signal is generated from particles flowing past the illuminated region inside the flow channel 201 as they interact with the illumination zone. One detector 205 is used that senses light that is back-scattered from the traversing particles 207 as they interact with the illumination zone. The forward beam is blocked and diverted to an absorbing medium 206 as to not interfere with the signal at the back-scatter detector 205. Deconvolution from PHD to PSD is done via the algorithm disclosed herein.

Figure 21:
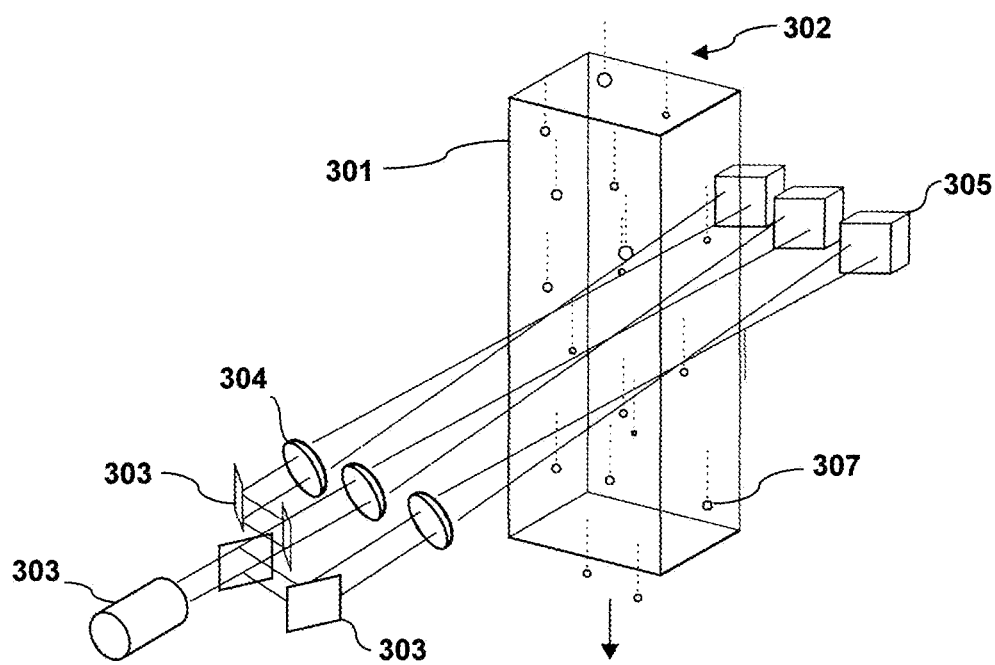
FIG. 21 illustrates a schematic of an optical scheme typically used in the third alternate embodiment of the current invention.

Referring to FIG. 21, in a third alternate embodiment the particle sizing method of the current invention is not limited to a single light source but works for a number of different light sources 303, lenses 304 and detectors 305 in the probe light beam(s) through the flow channel 301. These alternate embodiments are possible because having one or many brightest spots generating signal from the particles 307 in the suspension 302 is of no importance in the characterization of the sensor. The brightest spot or spots will produce the tallest pulses for a given size probe particle is what matters. The quantity of spots will change the distribution of counts in the remaining spectrum, but that is what characterization is about, to record such behavior. One might use multiple focused spots to generate signal from multiple locations thereby increasing the efficiency factor of what is 'seen,' at the cost of lowering the operating concentration of the sensor, as a practical trade-off. The observation above is powerful in that it opens the door to alternate embodiments of sensors using the same characterization approach to achieve a size distribution from a pulse height distribution. Alternatively, in this configuration, the signal from each detector can be processed separately into separate PHDs, and by using different focal length lenses, 3 PHD's can be simultaneously constructed, each covering pulses from a different size range. This in effect expands the dynamic range of the sensor. Each 'channel' would have to have its own characterization spectra to apply to the respective PHD's.

Figure 22:
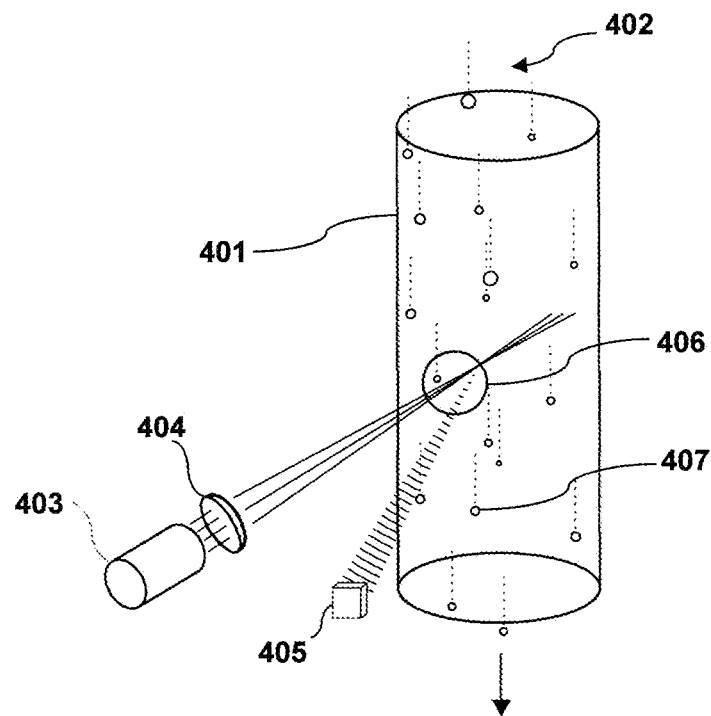
FIG. 22 illustrates a schematic of an optical scheme typically used in the fourth alternate embodiment of the current invention.

Referring to FIG. 22 in a fourth alternate embodiment, whereby a sensor can be constructed having focused light introduced into an opaque flow channel 401 through a window 406 on the side of the flow channel 401 as a colloidal suspension 402 is flowing in the flow channel 401 in conjunction with a back scatter detector 405. Back Scatter occurs when light from the beam and particle 407 interaction, travels in the backward direction relative to the beam direction. This light is collected at a detector 405 and processed through the counting electronics, where the detector 405 is located adjacent to the light source 403 and lens 404 and with a view of the region of focus, the distribution of particle sizes is characterized by this means.

Figure 23:
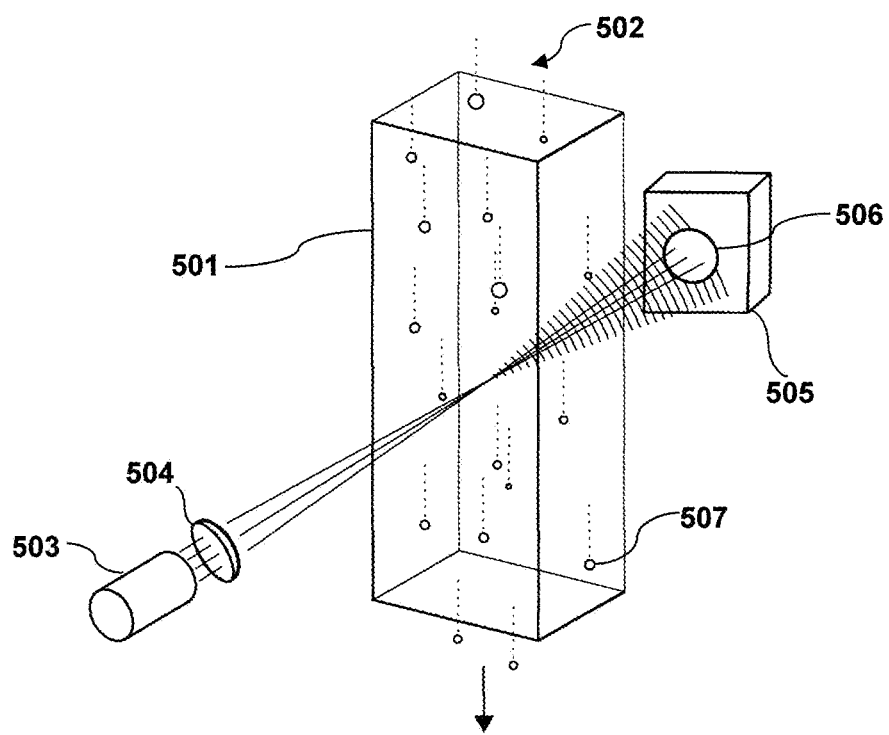
FIG. 23 illustrates a schematic of an optical scheme typically used in the fifth alternate embodiment of the current invention.

Referring to FIG. 23, in a fifth alternate embodiment the scatter detector 505 can be behind a mask 506 that blocks light from the illumination source 503, through the lens 504 and flow channel 501 from reaching the detector 505, but allows light scattered from a particle 507 from the sensing zone to impinge on the detector 505. A mask 506 is an opaque surface that blocks light from passing through it. Often masks 506 are strategically placed in order to block view of the illumination source 503 from the detector, or to select a subset of scattering angles of a signal as it travels to the detector 505, limiting the detection region for a higher concentration. This approach works for wet (liquid colloidal suspension) or dry (particles transported by a gas) particle sizing.

Figure 24:
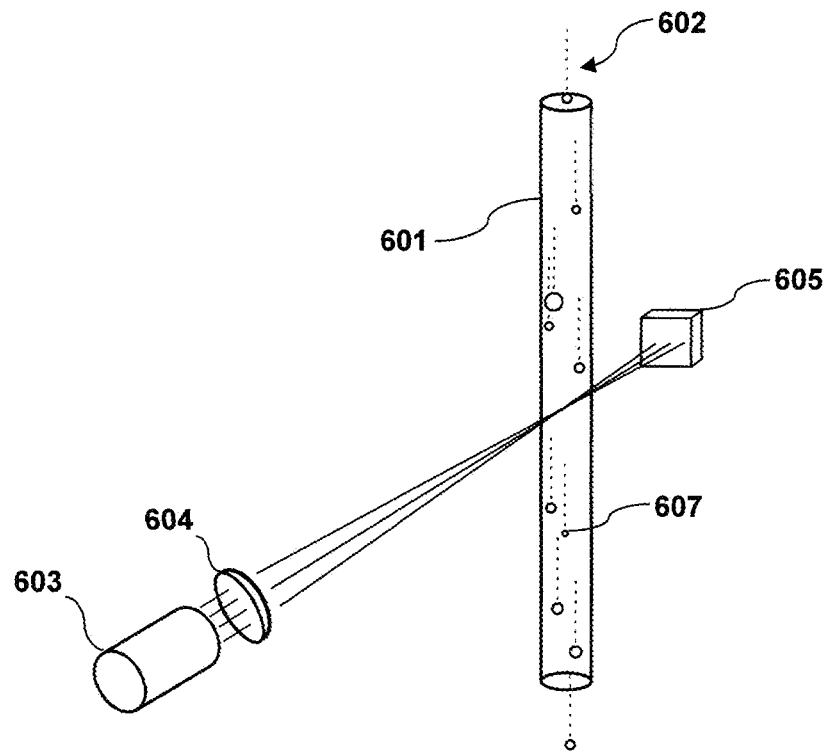
FIG. 24 illustrates a schematic of an optical scheme typically used in the sixth alternate embodiment of the current invention.

Referring to FIG. 24, in a sixth alternate embodiment a sensor can be constructed having focused light from a light source 603 and lens 604 introduced into a capillary flow channel 601 through the flow channel's transparent walls, as a colloidal suspension 602 is flowing in the capillary 601. The light is collected at the extinction detector 605 and processed through the counting electronics. The distribution of particle sizes 607 is characterized by this means. Any distortion in the beam caused by the imperfect manufacture and small diameter of the capillary 601 creates an imperfect focus spot, but the nature of this invention can deal with imperfect illumination zones, and properly deconvolute the resulting PHD's into PSD's.

Figure 25:
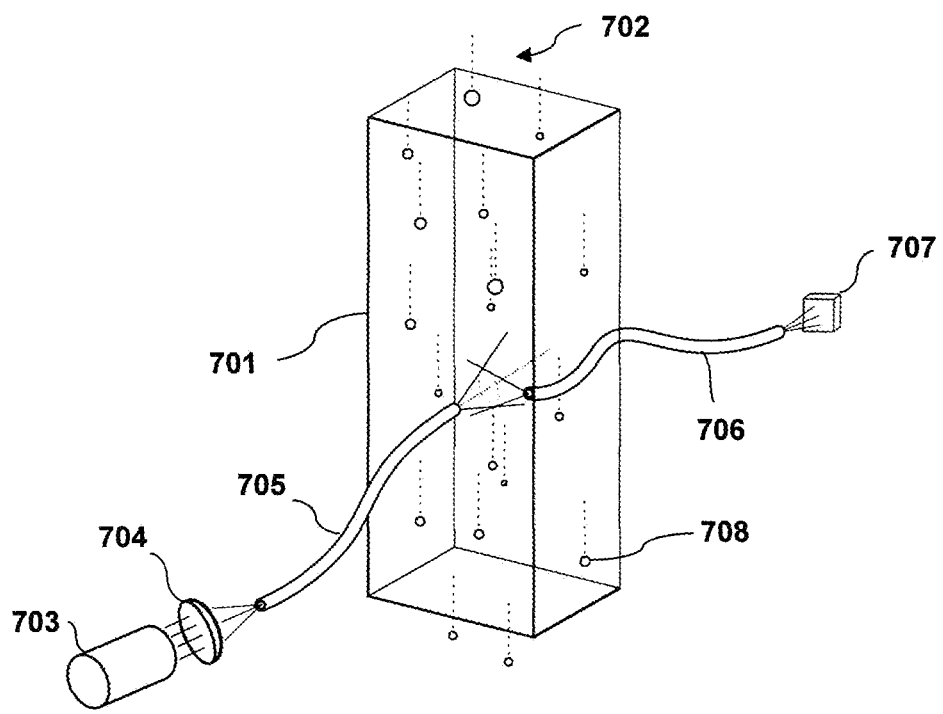
FIG. 25 illustrates a schematic of an optical scheme typically used in the seventh alternate embodiment of the current invention.

Referring to FIG. 25, in a seventh alternate embodiment of this method, is a sensor comprising of a light source 703, lens 704, and fiber 705 introducing light into a sensing zone in the flow channel 701, spreading out in a cone of light, and another fiber 706 and detector 707 closely spaced opposite and co-linear, detecting pulses from its own cone of acceptance. This technique is used to derive a size distribution of what particles 708 pass between the fibers 705, 706. The fibers 705, 706 can be slightly retractable, with the resulting sensor now made easier to clean, and freed from any jamming debris. Due to the larger light/particle interaction volume (sensing zone), which is not a focused spot, makes this arrangement best suited for use with lower concentration colloidal suspensions 702.

Referring to FIG. 26, in an eighth alternate embodiment of this method, the sensor is comprised of two parallel fibers 805, 806 in a probe configuration, one supplying light 805 from a light source 803 and lens 804 and the other detecting the back-scatter 806. The probe introduced into a moving colloidal suspension 802 of sufficient dilution flowing through the flow channel 801 that individual pulses from particles 808 can be sensed by the back-scatter detector 807, and their size distribution thusly characterized. The spreading nature of the light makes this is a low concentration sensor.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for deconvoluting a pulse height distribution PHD of a fluid suspension of unknown composition flowing through a single-particle optical sizing sensor apparatus that utilizes a non-parallel and non-uniform beam profile, said method comprising:
    providing a single-particle optical sizing sensor apparatus wherein a beam of light is directed through a measurement flow channel to form a non-uniform sensing zone within the measurement flow channel;
    wherein in the non-uniform sensing zone the beam of light comprises an illumination field with a smallest focus region where maximum illumination intensity is reached and a largest focus region where minimum illumination intensity is reached;
    wherein the single-particle optical sizing sensor apparatus further comprises a detector which detects when particles traverse the non-uniform sensing zone and interact with the illumination field, and outputs signals of varying pulse heights, depending on the particle size and location of the particle within the non-uniform sensing zone;
    wherein the signals of varying pulse heights are organized into a pulse height distribution PHD where a largest particle passing through the smallest focus region of the non-uniform sensing zone will create a tallest pulse height and a smaller particle will create a smaller pulse height;
    creating a plurality of normalized characterization PHDs, normalized on a right most channel with particle counts;
    creating a data set PHD of the fluid suspension of unknown composition by flowing the fluid suspension of unknown composition through the single-particle optical sizing sensor apparatus and histogramming the height of the pulses detected;
    identifying a tallest pulse height in the PHD of a fluid suspension of unknown composition and identifying a correlating characterization PHD with a same tallest pulse height, such that the tallest height in the PHD of the fluid suspension of unknown composition is equal to the tallest pulse height in the correlating characterization PHD;
    creating a contribution PHD by multiplying one channel of the PHD of a fluid suspension of unknown composition and the correlating normalized characterization PHD;
    subtracting the contribution PHD from the PHD of a fluid suspension of unknown composition to create an intermediate PHD;
    repeating this process for the next remaining tallest pulse height in the intermediate PHD until the PHD of a fluid suspension of unknown composition has been completely deconvoluted into a PSD;
    where creating the plurality of normalized characterization PHDs comprises flowing a plurality of fluid suspensions of known composition through the single-particle optical sizing sensor apparatus, recording the output signals of the detector, and normalizing the output signals of the detector, and normalizing the output signals of the tallest pulse height in the characterizing PHD to a value of one;
    wherein the tallest pulse height is the upper most channel where there are no counts beyond the upper most channel.

2. The method of claim 1, where the method of creating a data set PHD further comprises recursively eliminating the expected statistical contribution to the data set PHD after recording the outputs signals of the detector.

3. The method of claim 1, where the single-particle optical sizing sensor apparatus utilizes extinction detection.

4. The method of claim 1, where the single-particle optical sizing sensor apparatus utilizes scatter detection.

5. The method of claim 1, where the single-particle optical sizing sensor apparatus utilizes both extinction detection and scatter detection.

* * * * *